(12) United States Patent
O'Connor et al.

(10) Patent No.: US 12,446,971 B2
(45) Date of Patent: Oct. 21, 2025

(54) CALIBRATION FOR SURGICAL NAVIGATION

(71) Applicant: NuVasive, Inc., San Diego, CA (US)

(72) Inventors: Sean O'Connor, San Diego, CA (US); Nissim Avitan, Jerusalem (IL); Elazar Cohen, Jerusalem (IL); Gilad Stern, Jerusalem (IL); David Wanderman, Modi'in (IL)

(73) Assignee: NuVasive, Inc., San Diego, CA (US)

( * ) Notice: Subject to any disclaimer, the term of this patent is extended or adjusted under 35 U.S.C. 154(b) by 353 days.

(21) Appl. No.: 18/149,523

(22) Filed: Jan. 3, 2023

(65) Prior Publication Data

US 2024/0216072 A1 Jul. 4, 2024

(51) Int. Cl.
  *A61B 34/20* (2016.01)
  *A61B 6/00* (2024.01)
  *A61B 17/00* (2006.01)

(52) U.S. Cl.
  CPC ............ *A61B 34/20* (2016.02); *A61B 6/4441* (2013.01); *A61B 2017/00725* (2013.01); *A61B 2034/2065* (2016.02)

(58) Field of Classification Search
  None
  See application file for complete search history.

(56) References Cited

U.S. PATENT DOCUMENTS

| | | | |
|---|---|---|---|
| 9,510,771 B1 | 12/2016 | Finley et al. | |
| 9,785,246 B2 | 10/2017 | Isaacs et al. | |
| 11,350,995 B2 | 6/2022 | Finley et al. | |
| 2005/0281385 A1 | 12/2005 | Johnson et al. | |
| 2006/0109957 A1* | 5/2006 | Lutjens | A61B 6/587 378/205 |
| 2011/0211076 A1 | 9/2011 | Li et al. | |
| 2014/0118557 A1 | 5/2014 | Lee et al. | |
| 2015/0085979 A1 | 3/2015 | Zheng et al. | |
| 2016/0278732 A1* | 9/2016 | Amiri | A61B 6/547 |
| 2017/0103509 A1 | 4/2017 | Scharfenberger et al. | |
| 2017/0180689 A1 | 6/2017 | Morrison et al. | |

(Continued)

OTHER PUBLICATIONS

Peter Tate et al., "Performance and Robustness of Automatic Fluoroscopic Image Calibration in a New Computer Assisted Surgery System", Springer-Verlag Berlin, 2001, MICCAI 2001, LNCS 2208, pp. 1130-1136.

(Continued)

*Primary Examiner* — Edwin C Gunberg

(57) ABSTRACT

Examples of the disclosure include methods and systems for calibrating a C-arm imaging device for surgical navigation. Calibrating the C-arm imaging device may include, for a plurality of positions of the C-arm imaging device, determining the position of the C-arm imaging device, receiving an image of a calibration fixture from the C-arm imaging device, determining the position of the calibration fixture and a tracking array positioned on the C-arm imaging device, determining intrinsic parameters using the image and the position of the calibration fixture, and determining extrinsic parameters using the position of the tracking array relative to a detector of the C-arm imaging device. Calibrating the C-arm imaging device may include modeling parameters for the C-arm imaging device and iteratively tuning the model.

18 Claims, 8 Drawing Sheets

(56) References Cited

U.S. PATENT DOCUMENTS

2017/0228864 A1    8/2017   Liu et al.
2017/0296136 A1   10/2017   Rai et al.
2018/0092699 A1    4/2018   Finley
2019/0000564 A1    1/2019   Navab et al.
2022/0096180 A1    3/2022   Finley et al.
2022/0296326 A1    9/2022   Deng et al.

OTHER PUBLICATIONS

Cai Meng et al., "New method for geometric calibration and distortion correction of conventional C-Arm", Computers in Biology and Medicine 52 (2014); 49-56.
Ziv R. Yaniv et al., "Fluoroscopic image processing for computer-aided orthopedic surgery", Thesis, Oct. 1, 1998, 65 pages.
Leo Joskowicz, "Fluoroscopy-based navigation in computer-aided orthopaedic surgery", 2000, 6 pages.
Leloup et al., "Automatic fluoroscopic Image Calibration for Traumatology Intervention Guidance", Eurocon Conference Paper, Serbia & Montenegro, Belgrade, Nov. 22-24, 2005, pp. 374-377.
TrackX Instrument Tracking Technology, Introducing TrackX webpage located on Mar. 13, 2023 at: https://www.trackx.tech, copyright 2021, 4 pages.
Globus Medical, Globus Excelsius 3D Intelligent Imaging, located online on Mar. 13, 2023 at: https://www.globusmedical.com/musculoskeletal-solutions/excelsiustechnology/excelsius3d/, 4 pgs.
Stryker SpineMap Go, located online on Mar. 13, 2023 at: https://www.stryker.com/us/en/navigation/products/spinemap-go.html, last updated Sep. 2022, 3 pages.

\* cited by examiner

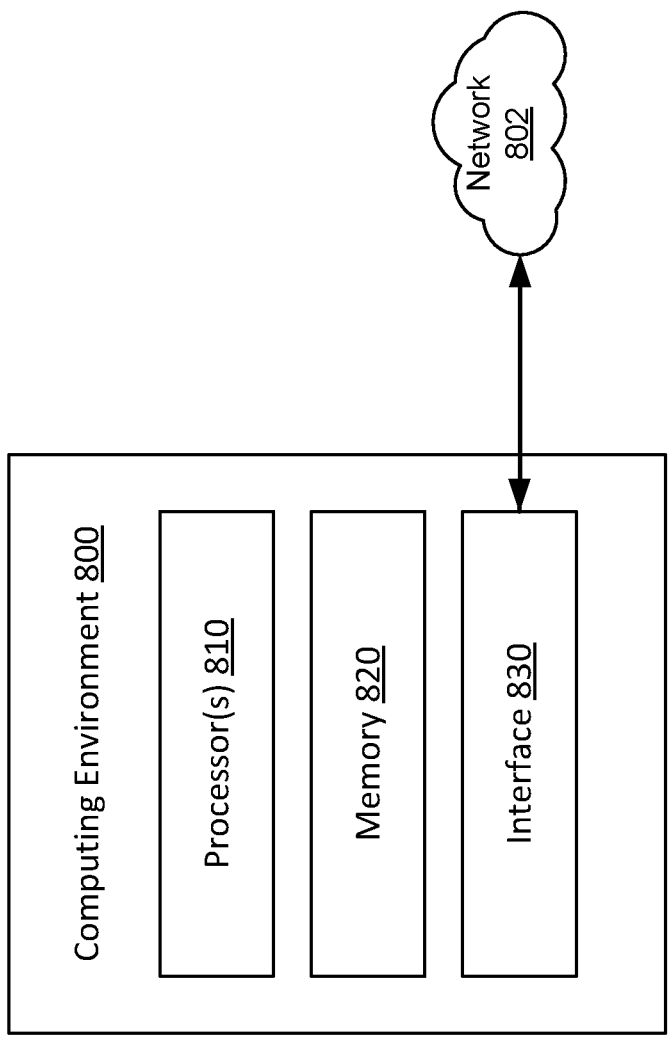

CALIBRATION FOR SURGICAL NAVIGATION

TECHNICAL FIELD

Example aspects described herein relate generally to surgical navigation, and more particularly to calibrating imaging systems for use in surgical navigation.

BACKGROUND

During fluoroscopy, a subject is disposed between an X-ray emitter and detector. One variety of X-ray emitter and detector used during surgery is known a C-arm. An X-ray beam is emitted from the emitter to the detector such that the beam passes through the subject. The detected X-rays result in an X-ray image that can be transmitted to one or more other devices for any of a variety of uses. Such images can be used to monitor movement of a body part or of an instrument. In addition, the images can be used for navigation, such as 2D surgical navigation, to provide real-time rendering of a handheld surgical instrument in the correct location in a medical image. This rendering enables a surgeon to understand the position of an instrument. Fluoroscopy is typically modelled as a perspective projection, where the parameters of the projection are estimated through a calibration procedure. Precise inter-procedural calibration is beneficial for accurate quantitative fluoroscopy guidance.

C-arms are typically calibrated inter-operatively using cumbersome hardware and artificial fiducial objects embedded in the X-ray image. Such calibration significantly adds to system complexity, which is a major impediment to clinical practice.

Surgical navigation systems can determine the spatial position and orientation of relevant anatomical features, implants, and instruments using and processing captured images. An example surgical navigation system is described in US 2018/0092699, filed Oct. 5, 2017, as application Ser. No. 15/725,791, which is hereby incorporated herein by reference for any and all purposes.

SUMMARY

The present disclosure provides methods and systems for providing C-arm calibration for surgical navigation. In an example embodiment, there is a method for calibrating a C-arm imaging device involving, for each of a plurality of positions of the C-arm imaging device, determining an angulation value and an orbital value of the C-arm imaging device, preoperatively receiving an image of a calibration fixture from the C-arm imaging device, the imaging having been taken while the C-arm imaging device had the angulation value and the orbital value, determining the position of the calibration fixture and the position of a tracking array positioned on the C-arm imaging device relative to a detector plane of a detector of the C-arm imaging device using a tracking system, determining intrinsic parameters using the image of the calibration fixture and the position of the calibration fixture, and determining extrinsic parameters using the position of the tracking array relative to the detector plane. The method also includes generating a model configured to receive orbital and angulation values for a current pose of the C-arm imaging device as input and configured to provide as output extrinsic and intrinsic parameters of the C-arm imaging device, wherein generating the model includes: determining initial parameters using the intrinsic parameters, the extrinsic parameters, the angulation value, and the orbital value of the plurality of positions of the C-arm imaging device, determining intermediate parameters using the intrinsic parameters, the angulation value, and the orbital value of the plurality of positions of the C-arm imaging device, and a fixed set of extrinsic parameters, and determining final parameters using the initial parameters and the intermediate parameters. The intrinsic parameters may comprise a focal length; a first offset in a first axis between an emitter of the C-arm imaging device and the detector; and a second offset in a second axis between the emitter and the detector. The extrinsic parameters may comprise a first translation in a first axis between the tracking array and the detector plane; a second translation in a second axis between the tracking array and the detector plane; a third translation in a third axis between the tracking array and the detector plane; a first rotational offset in the first axis between the tracking array and the detector plane; a second rotational offset in the second axis between the tracking array and the detector plane; and a third rotational offset in the third axis between the tracking array and the detector plane. In some embodiments, at least two of the images received were taken while the C-arm imaging device is in motion. Determining the intermediate parameters can comprise tuning the initial parameters to form the intermediate parameters. In example embodiments, the model is a functional form model and generating the model includes performing a functional fit for the intrinsic parameters and the extrinsic parameters. For each of the plurality of positions of the C-arm imaging device, the image, the position of the calibration fixture, and the position of the tracking array positioned on the C-arm imaging device relative to the detector plane are time synchronized. The method may further include using the model for at least three months without updating the model. Updating the model may include, for two new positions of the C-arm imaging device, determining the angulation value and the orbital value of the C-arm imaging device, receiving a new image of the calibration fixture from the C-arm imaging device, determining the position of the calibration fixture and the position of the tracking array positioned on the C-arm imaging device relative to the detector plane using the infrared tracking system, determining new intrinsic parameters using the new image of the calibration fixture and the position of the calibration fixture, and determining new extrinsic parameters using the position of the tracking array relative to the detector plane. Updating the final parameters may further include updating the final parameters based on the new intrinsic parameters, the new extrinsic parameters, the angulation value, and the orbital value for the two new positions of the C-arm imaging device.

Another embodiment involves a system for calibrating a C-arm imaging device that includes a calibration fixture configured to be imaged by the C-arm imaging device; a tracking array configured to be positioned on the C-arm imaging device; a tracking device configured to track the calibration fixture and the tracking array; and a C-arm calibration device. The C-arm calibration device may comprise one or more processors and a memory, wherein the memory comprises instructions that, when executed by the one or more processors, causes the one or more processors to, for each of a plurality of positions of the C-arm imaging device, determine an angulation value and an orbital value of the C-arm imaging device, preoperatively receive an image of the calibration fixture from the C-arm imaging device, determine the position of the calibration fixture and the position of the tracking array positioned on the C-arm imaging device relative to a detector plane of a detector of the C-arm imaging device using the tracking device, determine intrinsic parameters using the image of the calibration fixture and the position of the calibration fixture, and determine extrinsic parameters using the position of the tracking array relative to the detector plane. The instructions may also cause the one or more processors to generate a model using the intrinsic parameters, the extrinsic parameters, the angulation value, and the orbital value of the plurality of positions of the C-arm imaging device. The memory may further comprise instructions that causes the one or more processor to perform an iterative functional form calibration to refine the model. To perform the iterative functional form calibration to refine the parameters comprises to: fix a set of extrinsic parameters, determine intermediate parameters using the intrinsic parameters, the angulation value, and the orbital value of the plurality of positions of the C-arm imaging device and the fixed set of extrinsic parameters; and model final parameters of the C-arm imaging device using the parameters and the intermediate parameters. To model the initial parameters may comprise to generate a functional form model, and determine final parameters of the C-arm imaging device using the parameters and the intermediate parameters. The model may be configured to receive orbital and angulation values for a current pose of the C-arm imaging device as input and configured to provide as output extrinsic and intrinsic parameters of the C-arm imaging device. Generating the model may comprise to perform a functional fit for the intrinsic parameters and the extrinsic parameters. The intrinsic parameters may comprise: a focal length; a first offset in a first axis between an emitter of the C-arm imaging device and the detector; and a second offset in a second axis between the emitter and the detector. The extrinsic parameters may comprise a first translation in a first axis between the tracking array and the detector plane; a second translation in a second axis between the tracking array and the detector plane; a third translation in a third axis between the tracking array and the detector plane; a first rotational offset in the first axis between the tracking array and the detector plane; a second rotational offset in the second axis between the tracking array and the detector plane; and a third rotational offset in the third axis between the tracking array and the detector plane. The memory may comprise further instructions that cause the one or more processors to update the model after no less than three months. To update the parameters may comprise, for two new positions of the C-arm imaging device: determine the angulation value and the orbital value of the C-arm imaging device, cause the C-arm imaging device to capture a new image of the calibration fixture, determine the position of the calibration fixture and the position of the tracking array positioned on the C-arm imaging device relative to the detector plane, determine new intrinsic parameters using the new image of the calibration fixture and the position of the calibration fixture, and determine new extrinsic parameters using the position of the tracking array relative to the detector plane; and update the model based on the new intrinsic parameters, the new extrinsic parameters, the angulation value, and the orbital value for the two new positions of the C-arm imaging device. The system may further comprise a display device configured to display images, wherein the memory further comprises instructions that, when executed by the one or more processors, causes the one or more processors to: render a surgical instrument in a location in a medical image; and cause the display device to display the medical image including the rendered surgical instrument. To generate the model may be performed offline.

BRIEF DESCRIPTION OF THE DRAWINGS

The features and advantages of the example embodiments of the invention presented herein will become more apparent from the detailed description set forth below when taken in conjunction with the following drawings.

FIG. 8 illustrates an example computing environment that can be used to implement techniques described herein.

DETAILED DESCRIPTION

Figure 1:
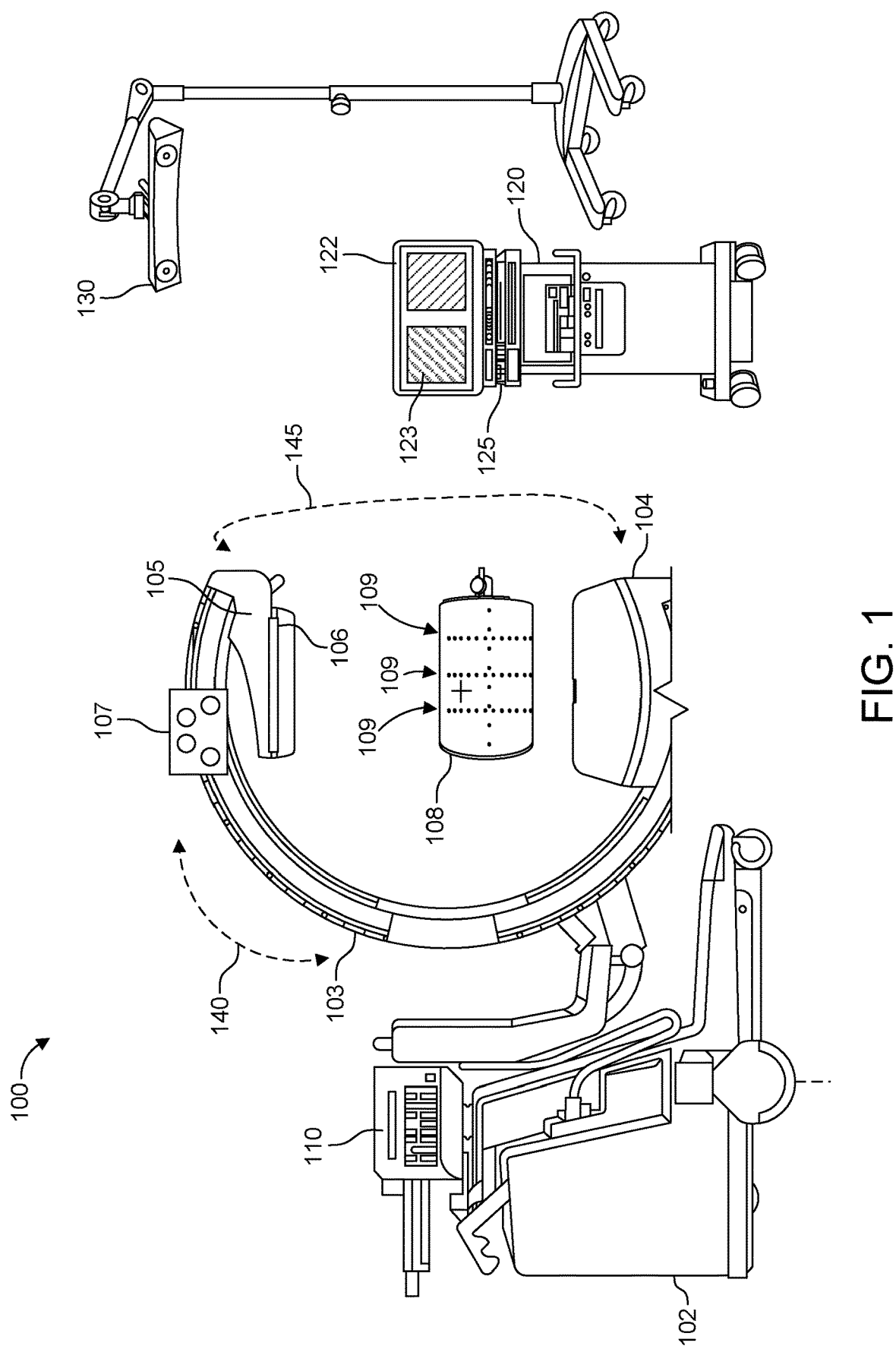
FIG. 1 illustrates a system having one or more components within an operating room according to an example embodiment.

The example embodiments of the invention presented herein are directed to methods and systems for calibration of a C-arm imaging device, such as for surgical navigation. The surgical navigation may be two-dimensional (2D) navigation that includes a surgical area (e.g., a spine of a patient) and real-time rendered surgical devices and instruments (e.g., screws, implants, inserters, scissors, screw drivers, drills, probes, clamps, graspers, bone cutters, and the like).

In some embodiments, a C-arm calibration device operates to perform offline calibration, for example in a separate procedure before live surgery is performed. Offline calibration can be in contrast to "online" calibration that takes place during a surgery. Online calibration often includes the use of cumbersome hardware and artificial fiducial objects embedded in the X-ray image due to the use of a tracking fixture with grids of markers mounted to a C-arm imaging device. The markers may obscure portions of images the C-arm imaging device captures.

In an example technique described herein, a C-arm calibration device may use an iterative calibration algorithm that when executed by the C-arm calibration device causes the iterative calibration algorithm to generate a functional form model for use during 2D navigation and to iteratively refine the functional form model. The iterative calibration algorithm may provide the functional form model to 2D navigation systems to use for improved accuracy for surgical navigation. An initial offline calibration can include receiving images of a calibration fixture captured by a C-arm imaging device for multiple positions of the C-arm imaging device. Then the position of the calibration fixture and the position of a tracking array positioned on the C-arm imaging device relative to a detector plane of a detector of the C-arm imaging device can be determined using a tracking system (e.g., an infrared tracking system) for each position. Intrinsic parameters are determined using the image of the calibration fixture and the position of the calibration fixture for each position. Extrinsic parameters are determined using the position of the tracking array relative to the detector plane for each position. Initial parameters of the C-arm imaging device are modeled using the intrinsic parameters, the extrinsic parameters, the angulation value, and other data, such as the orbital and angulation values of the plurality of positions of the C-arm imaging device. Next, values for a fixed set of extrinsic parameters are determined. intermediate parameters of the C-arm imaging device are modeled using the intrinsic parameters, the angulation value, and the orbital value of the plurality of positions of the C-arm imaging device and the fixed set of extrinsic parameters. Then final parameters of the C-arm imaging device are modeled using the initial parameters and the intermediate parameters. The final parameters can be used to ensure calibration.

Aspects of the C-arm calibration device disclosed herein operate to provide an updated calibration after the initial offline calibration (e.g., before a surgery) by receiving new images of the calibration device from the C-arm imaging device in at least two positions, determining intrinsic parameters and extrinsic parameters for the at least two positions, and refining the final parameters using the intrinsic parameters and extrinsic parameters for the at least two positions. Thus, one advantage of the C-arm calibration device herein is that fewer inputs are required to recalibrate the C-arm imaging device than the number of inputs required to perform the initial offline calibration.

In some embodiments, C-arm calibration uses images of a standalone calibration fixture. The calibration fixture may have a standardized or otherwise known geometry (e.g., physical dimensions). The calibration fixture contains radio-opaque fiducial markers (e.g., metal pellets) arranged in a known geometric shape. For example, the C-arm calibration device receives and/or stores the geometry of the calibration fixture and/or the markers. The images of the calibration fixture are taken with the C-arm imaging device that the C-arm calibration device is calibrating. In an example implementation, the C-arm imaging device captures and sends images of the calibration fixture to the C-arm calibration device. The C-arm calibration device can include or otherwise operate a tracking device (e.g., a near-infrared tracking system), and the tracking device operates to track a position of the calibration fixture, the radio-opaque fiducial markers, and/or the C-arm imaging device. For example, the C-arm calibration device operates to determine an expected position of the markers using the tracking device, the physical dimensions of the calibration fixture, and/or the arrangement of the markers. In some embodiments, the calibration fixture markers are used for standard camera resectioning. For example, in a reprojection process, the C-arm calibration device determines the positions of the calibration markers in images captured by the C-arm imaging device and the expected position of the calibration markers and compares the positions of the calibration markers in the images and the expected positions of the calibration markers. The C-arm calibration device may determine the expected positions of the calibration markers using the position of the C-arm imaging device, the position of the calibration fixture, the dimensions of the calibration fixtures, and/or the arrangement of the calibration markers. Because the calibration fixture is not necessarily attached to the C-arm imaging device, the calibration procedure may be done offline rather than for every image used during surgery ("online").

In some embodiments, the C-arm calibration device operates to perform online calibration during a surgery procedure. In an example implementation, the calibration fixture is positioned for calibration in addition to a patient be positioned for imaging by the C-arm imaging device during surgery. Online calibration may be preferred for C-arm imaging devices that utilize image intensifiers for example.

The C-arm calibration device may use the iterative algorithm to estimate the calibration parameters for different positions of the C-arm imaging device. For example, the C-arm imaging device may move in orientation degrees of freedom of the C-arm imaging device. The orientation degrees of freedom can include an orbital direction and an angulation direction. Generally, the orbital direction is along the "C" of the C-arm imaging device, the rotation axis is centered in the middle of the C and perpendicular to the plane of the C. Angulation tilts the entire C forward or backward (e.g., perpendicular to the plane of the C). The angulation rotation axis is generally horizontal (e.g., passing along the C-arm imaging device operator's front-to-back direction). This is usually perpendicular to the operating table. The C-arm imaging device may capture and send images of the calibration fixture for multiple orbital and angulation positions. The C-arm calibration device may perform the calibration at a sequence of orbital positions and angulation positions. The C-arm calibration device can determine the sequence of positions, so the C-arm calibration device has sufficient information. For example, the C-arm calibration device selects a number and/or arrangement of positions for the C-arm imaging device to capture images to perform calibration for all positions of the C-arm imaging device. Therefore, during surgery, a user can choose any position of the C-arm imaging device, and the images the C-arm calibration device uses for the calibration are in a sufficient arrangement and/or number of positions for the C-arm calibration device to have accurately interpolated the calibration for any position of the C-arm imaging device.

FIG. 1 illustrates a system 100 having one or more components within an operating room according to an example embodiment. The system 100 includes a base unit 102 supporting a C-arm imaging device 103. The C-arm imaging device 103 includes an emitter 104 and a detector 105. The emitter 104 operates to emit a radiation beam toward the detector 105. The detector 105, in some embodiments, includes a detector plane 106, and the detector 105 operates to detect radiation beams emitted by the emitter 104 that the detector plane 106 receives. Thus, the C-arm imaging device 103 can operate to capture images using the emitter 104 and the detector 105. The C-arm imaging device 103 operates to further determine or otherwise store an orbital value and an angulation value, which together provide the position of the C-arm imaging device 103. For example, the C-arm imaging device 103 can move in an orbital direction 140 and an angulation direction 145. The C-arm imaging device 103 can determine an orbital value based on the position of the C-arm imaging device 103 in the orbital direction 140. Similarly, the C-arm imaging device 103 can determine an angulation value based on the position of the C-arm imaging device 103 in the angulation direction 145.

In some embodiments, a tracking array 107 is mounted or otherwise connected to the C-arm imaging device 103. A calibration fixture 108 can be positioned between the emitter 104 and the detector 105, for performing C-arm calibration for example. The calibration fixture 108 includes markers 109 that are visible in images captured by the C-arm imaging device 103. The system 100 includes a tracking device 130. The tracking device 130 operates to track the position of the calibration fixture 108, the position of the tracking array 107, and the like. The tracking device 130 tracks the tracking array 107 and/or the C-arm calibration device 120 for the C-arm calibration device 120 to determine the relative position of the calibration fixture 108 to the C-arm imaging device 103. In an example implementation, the tracking device 130 is an infrared tracking system.

The base unit 102 includes a control system 110. The control system 110 allows a user, such as a surgeon, to control the position of the C-arm imaging device 103 and control the emitter 104 to cause the emitter 104 to emit radiation beams. Thus, the user can operate the C-arm imaging device 103 to capture images, such as images of the calibration fixture 108, by causing the emitter 104 to emit radiation beams that are detected by the detector 105.

The system 100 also includes a C-arm calibration device 120. The C-arm calibration device 120 may be a computing environment that includes a memory and a processor for executing digital and software instructions. An example computing environment is described in more detail in FIG. 8. The C-arm calibration device 120 can also include a display device 122 with displays 123 and an input device 125. A user can use the display device 122 and the input device 125 to cause the C-arm calibration device 120 to calibrate the C-arm imaging device 103. In some embodiments, the C-arm calibration device 120 communicates with the C-arm imaging device 103 to receive the position of the C-arm imaging device 103 (e.g., the orbital value and the angulation value) at the time the C-arm imaging device 103 captures images. The C-arm calibration device 120 can also communicate with the tracking device 130 to receive the positions of the tracking array 107, and the calibration fixture 108 when the C-arm imaging device 103 captures images. The C-arm calibration device 120 can cause the C-arm imaging device 103 to capture images, change position, and the like. The C-arm calibration device 120 can operate to cause the tracking device 130 to track the tracking array 107, the calibration fixture 108, and/or the like. In an example implementation, the C-arm calibration device 120 receives time synchronized images from the C-arm imaging device 103 and positions from the tracking device 130. Thus, the C-arm calibration device 120 receives the position of the calibration fixture 108 and the position of the tracking array 107 at the time the C-arm imaging device 103 captures an image. The C-arm calibration device 120 determines the expected position of the markers 109 using the tracking device 130 and/or the physical dimensions of the calibration fixture 108. The C-arm calibration device 120 may be positioned in the same location as the C-arm imaging device 103 or may be positioned remotely. In some examples, the C-arm calibration device 120 is part of another device or takes the form of software running on another device. In an example, there is a surgical cart that implements one or more aspects of the C-arm imaging device 103 or other devices or systems described herein. An example surgical cart is described in US 2022/0296326, which was filed on Mar. 7, 2022, as application Ser. No. 17/688,574, and which is hereby incorporated herein by reference in its entirety for any and all purposes.

In certain embodiments, users can use the C-arm calibration device 120 for surgical navigation once the C-arm calibration device 120 calibrates the C-arm imaging device 103. For example, the display device 122 displays, via the displays 123, the surgical area (e.g., the spine of a patient) and real-time rendered surgical instruments positioned based on the calibration of the C-arm imaging device 103. The C-arm imaging device 103 operate to capture an image of the surgical area and send the image to the C-arm calibration device 120 for display. A user, such as a surgeon, can use the input device 125 to select views of the surgical area, select surgical instruments to be rendered in the view of the surgical area, and/or the like. In one example, the C-arm calibration device 120 provides the calibration of the C-arm imaging device 103 to a different device that a user uses for surgical navigation.

Figure 2:
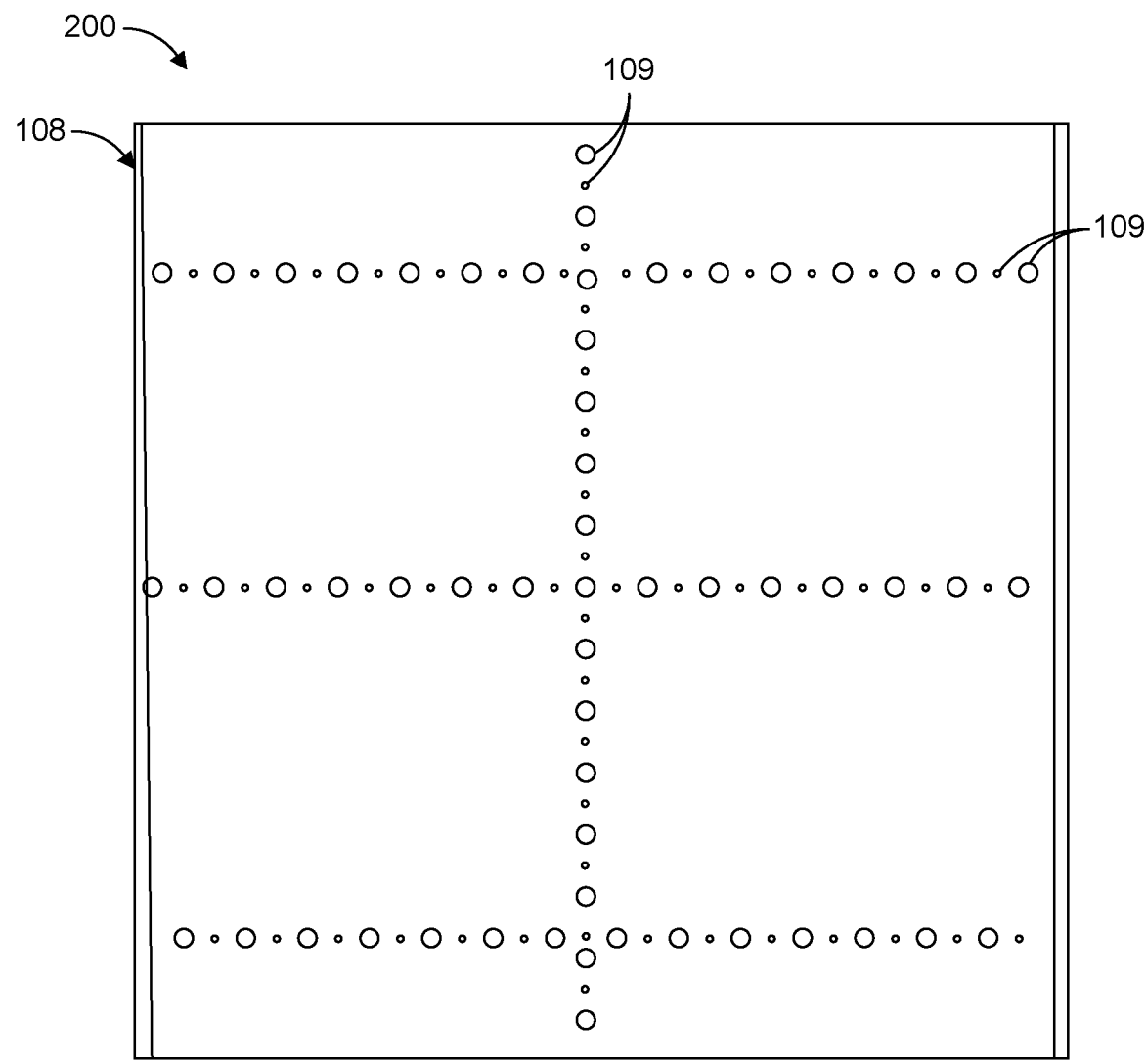
FIG. 2 illustrates an image of a calibration fixture captured by the C-arm imaging device according to an example embodiment.

FIG. 2 illustrates an image 200 of the calibration fixture 108 captured by the C-arm imaging device 103 according to an example embodiment. The image 200 includes the markers 109. The weight of the C-arm imaging device 103 and other factors can cause the emitter 104 and the detector 105 to be misaligned. The emitter 104 and the detector 105 may have a different alignment for different positions of the C-arm imaging device 103 (i.e., different orbital values and/or angulation values). Therefore, the positions of the markers 109 in the image 200 can be shifted from the expected positions because of the misalignment between the emitter 104 and the detector 105. The C-arm calibration device 120 can operate to receive the image 200 from the C-arm imaging device 103 to perform C-arm calibration. In some embodiments, the C-arm calibration device 120 compares the positions of the markers 109 in the image 200 to the expected positions of the markers 109, using the tracking device 130, the physical dimensions of the calibration fixture 108, and/or the arrangement of the markers 109 for example. The physical dimensions of the calibration fixture 108 may include the positions (e.g., the arrangement) of the markers 109. In this example, the markers 109 are arranged in a linear pattern (in other examples, the markers can have a helical or other shaped pattern), and the physical dimensions of the calibration fixture 108 can include the position of each marker 109 in the pattern. The markers 109 may be arranged to appear clearly in images captured by the C-arm imaging device 103 and/or to be spaced for determining the positions of the markers 109, by the C-arm calibration device 120 for example.

Figure 3:
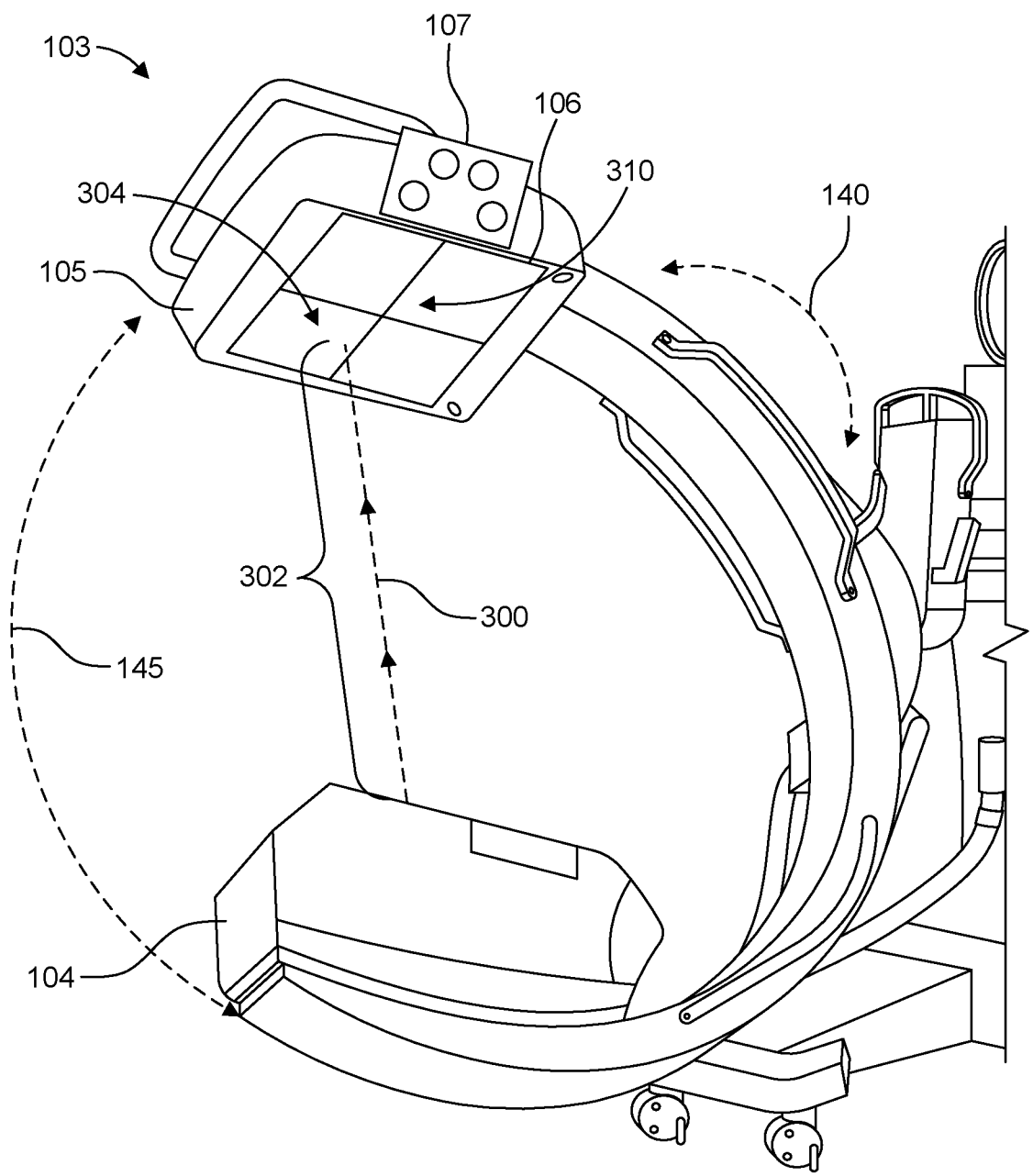
FIG. 3 illustrates a side perspective view of a C-arm imaging device according to an example embodiment.

FIG. 3 illustrates a side perspective view of the C-arm imaging device 103 according to an example embodiment. The emitter 104 can emit a radiation beam 300, and the detector 105 detects the radiation beam 300. In the example embodiment, the detector plane 106 detect the radiation beam 300 at the detection point 304 and not at the center 310 of the detector plane 106 because of misalignment between the emitter 104 and the detector 105 due to environmental effects such as gravity on the detector 105 and/or the emitter 104. For example, the detector 105 and/or the emitter 104 sags slightly in the position the C-arm imaging device 103 shown in FIG. 3. Thus, the C-arm calibration device 120 determines intrinsic parameters for the position of the C-arm imaging device 103: a focal length (z-axis), the focal length 302 for example, and an offset between the detection point 304 and the center 310 of the detector plane (x-axis and y-axis) to use the values for the C-arm calibration.

Figure 4:
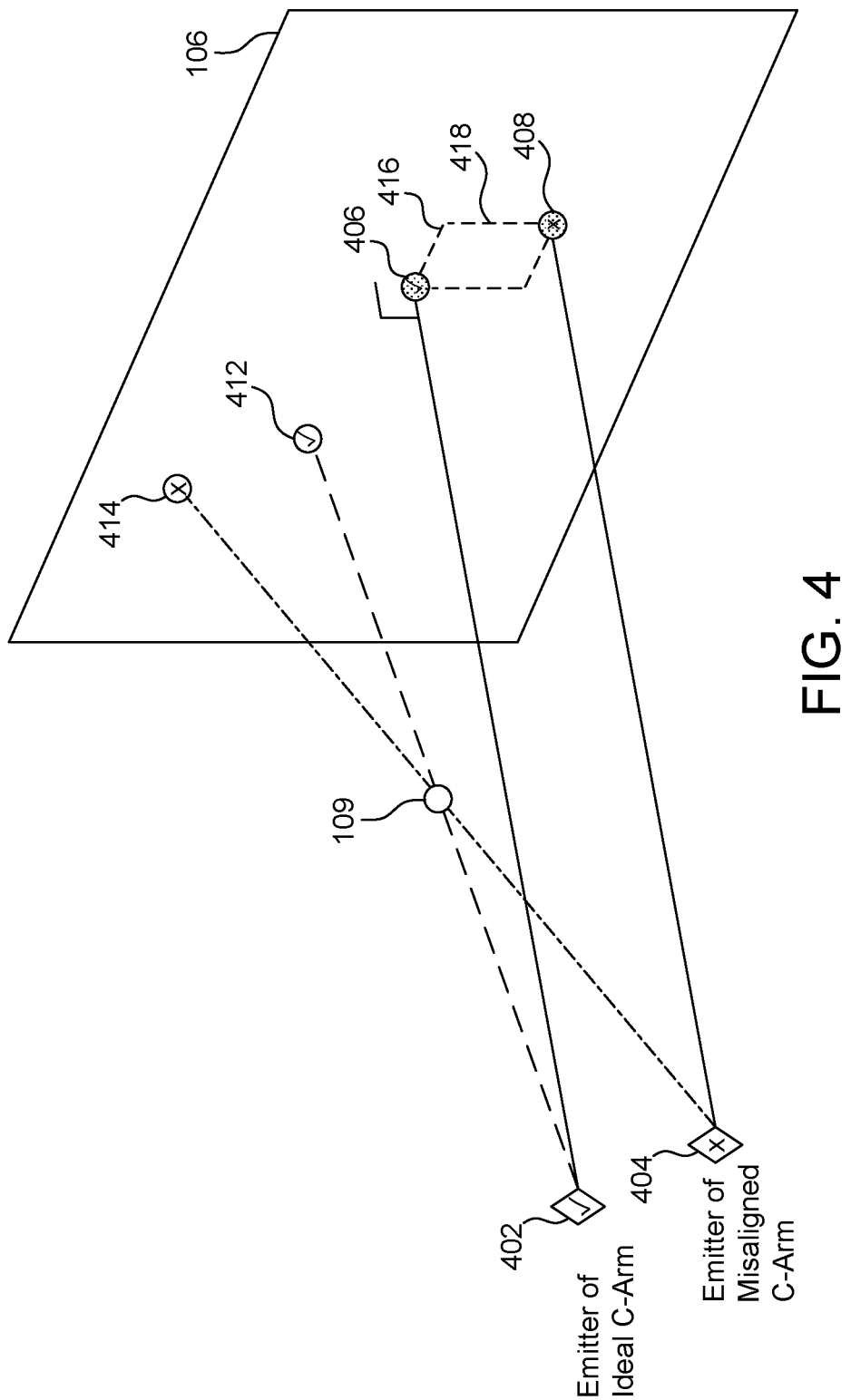
FIG. 4 illustrates a diagram of an emitter, a detector, and an arbitrary calibration marker of the C-arm imaging device according to an example embodiment.

FIG. 4 illustrates a diagram of emitters, a detector plane 106, and an arbitrary calibration marker 109 of the C-arm imaging device 103. The locations of an emitter 402 of an ideal C-arm (e.g., properly aligned) and an emitter 404 of a misaligned C-arm imaging device are shown. A marker 109 (e.g., of a calibration fixture 108) imaged by the emitter 402 of the ideal C-arm imaging device results in an image of the marker 109 in a first location 412. The marker 109 imaged by the emitter 404 of the misaligned C-arm imaging device results in an image of the marker 109 in a second location 414. As illustrated, the emitter 402 of the ideal C-arm imaging device is at a first position 406 relative to the x and y axes of the detector plane 106. The emitter 404 of the misaligned C-arm imaging device is at second first position 408 relative to the x and y axes of the detector plane 106. The first and second positions 406, 408 are separated by an x-axis offset 416 and a y-axis offset 418.

In an example implementation, the C-arm calibration device 120 is able to determine how to correct for the misalignment to position the second location 414 as though the C-arm were properly calibrated or aligned. In addition or instead, the calibration can be used to predict the actual projection of an object into an image, given the misalignment. In other words, the misalignment can be undone to determine what a properly aligned C-arm imaging device would produce. In some examples, it can be sufficient to understand the misaligned C-arm imaging device so new objects can be projected onto the image plane.

Figure 5:
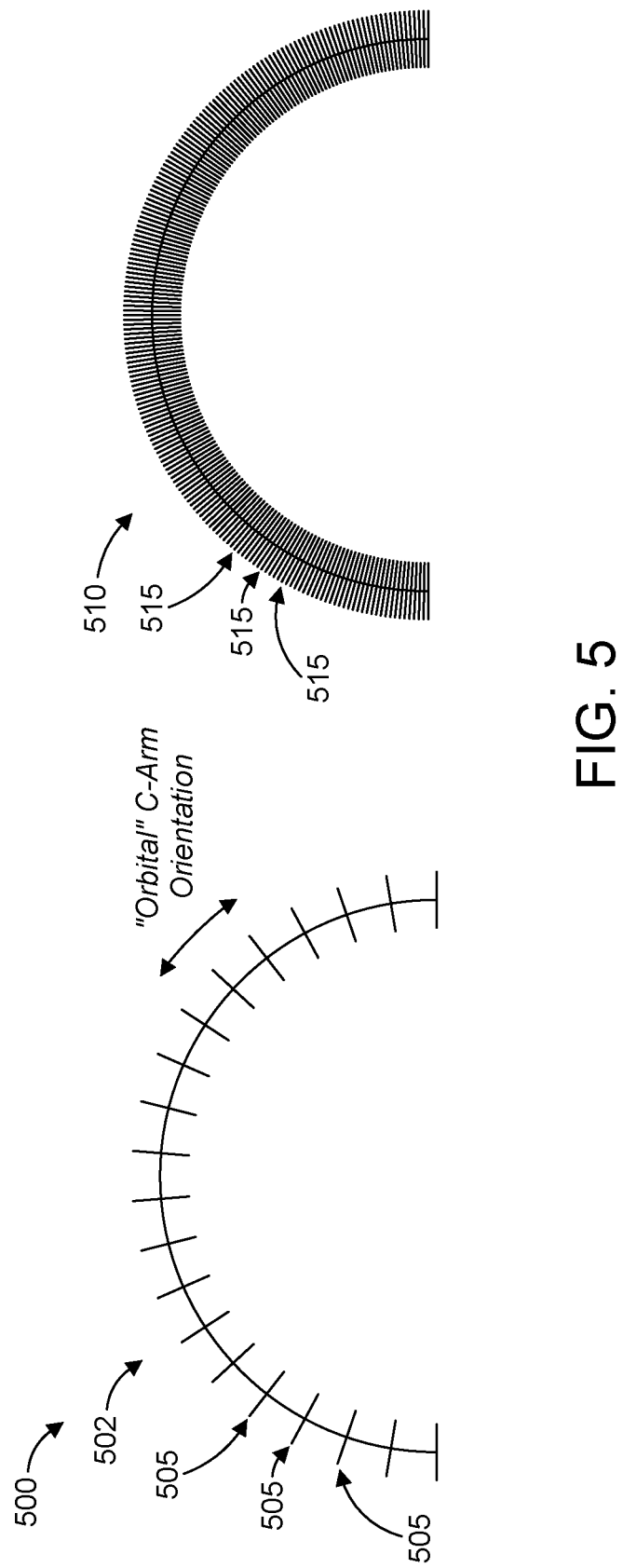
FIG. 5 illustrates a diagram of positions of the C-arm imaging device when the C-arm imaging device captures images for calibration according to an example embodiment.

FIG. 5 illustrates a diagram 500 of positions of the C-arm imaging device 103 when the C-arm imaging device 103 captures images for calibration. The diagram 500 includes a static shot positioning setup 502 with positions 505 and a continuous shot positioning setup 510 with positions 515. Shot can refer to taking an x-ray image. For example, a static shot can be a single image taken when the C-arm imaging device 1p3 is stationary. As another example, a continuous shot can be a series of shots taken rapidly one after another or a long exposure shot. In some embodiments, the C-arm imaging device 103 captures and sends an image of the calibration fixture 108, such as image 200 for example, to the C-arm calibration device 120. The C-arm calibration device 120 receives images at the positions 505 of the static shot position setup 502 when the C-arm imaging device 103 moves to one of the positions 505, stops movement, and then captures the image. In certain embodiments, the C-arm calibration device 120 receives images at the positions 515 of the continuous shot position setup 510 when the C-arm imaging device 103 moves to one of the positions 515 and captures the image without stopping movement. The C-arm calibration device 120 can cause the C-arm imaging device 103 to capture static shots or continuous shots when receiving images for the calibration. When capturing static shots, the C-arm calibration device 120 causes the C-arm imaging device 103 to capture a predetermined number of images (e.g., fifty, one hundred) for the calibration in some example implementations. When capturing continuous shots, the C-arm calibration device 120 can operate to cause the C-arm imaging device 103 to capture images for a predetermined number of spins of the C-arm imaging device 103 (e.g., five, ten, twenty) for the calibration in some example implementations.

The C-arm imaging device 103 can capture images at the positions 505 and/or the positions 515. In some embodiments, the C-arm imaging device 103 also sends the orbital value and/or the angulation value of the C-arm imaging device 103 when the C-arm imaging device 103 captures an image (e.g., a position 505 or a position 515). The C-arm imaging device 103 can operate to capture and send images of the calibration fixture 108 for multiple positions of the C-arm imaging device 103 and send the associated orbital value and angulation value for each image. Additionally, the tracking device 130 sends the position of the calibration fixture 108 and the position of the tracking array 107 to the C-arm calibration device 120 when the C-arm imaging device 103 captures an image of the calibration fixture 108. Thus, the C-arm calibration device 120 receives images of the calibration fixture 108, the associated orbital value and angulation value for each image, and/or associated positions of the tracking array 107 and the calibration fixture 108 when the C-arm imaging device 103 captures images at different positions of the C-arm imaging device 103.

In some embodiments, the C-arm calibration device 120 performs camera resectioning using the image of the of the calibration fixture 108 at a position of the C-arm imaging device 103 to determine the intrinsic parameters (e.g., the focal length and the offsets for a position of the C-arm imaging device 103). For example, the C-arm calibration device 120 compares the positions of the markers 109 in the image to the expected positions of the markers 109 using the position of the calibration fixture 108, the physical dimensions of the calibration fixture 108, and/or the arrangement of the markers 109. In an example implementation, the C-arm calibration device 120 receives the physical dimensions of the calibration fixture 108 from a user input, using the tracking device 130, and/or the like.

The C-arm calibration device 120 can also receive the position of the tracking array 107 relative to the detector plane 106 from the tracking device 130. The C-arm calibration device 120 may perform camera resectioning using the position of the tracking array 107 relative to the detector plane 106 to determine a first translation in a first axis (e.g., the x-axis) between the tracking array 107 and the detector plane 106, a second translation in a second axis (e.g., the y-axis) between the tracking array 107 and the detector plane 106, a third translation in a third axis (e.g., the z-axis) between the tracking array 107 and the detector plane 106, a first rotational offset in the first axis between the tracking array 107 and the detector plane 106, a second rotational offset in the second axis between the tracking array 107 and the detector plane 106, and a third rotational offset in the third axis between the tracking array 107 and the detector plane 106. The three translations and three rotational offsets are the extrinsic parameters. Thus, the C-arm calibration device 120 performs the camera resectioning using the position of the tracking array 107 relative to the detector plane 106 to determine the extrinsic parameters.

Once the C-arm calibration device 120 determines the intrinsic parameters and the extrinsic parameters associated with the sequence of positions of the C-arm imaging device 103, the C-arm calibration device 120 can model initial parameters of the C-arm imaging device 103 using the intrinsic parameters, the extrinsic parameters, the angulation value, and the orbital value of the positions of the C-arm imaging device 103. A user can use the initial parameters for surgical navigation at any position of the C-arm imaging device 103.

The physical bending and drooping of the C-arm imaging device 103 as a function of orientation can be understood to smoothly vary because the C-arm imaging device 103 is a physical object and there should not be any abrupt jumps in internal geometry. Thus, the C-arm calibration device 120 can model the intrinsic parameters and extrinsic parameters using a smoothly varying function in orbital value and/or angulation position. In some embodiments, the C-arm calibration device 120 performs a functional fit for each parameter as a function of orientation and uses a least-squares fitting to find the optimal shape of the function. The C-arm calibration device 120 can determine a functional form model to match any particular C-arm imaging device (e.g., polynomial of arbitrary degree, trigonometric, or other more complex functions).

Not all parameters may be entirely independent. For example, an error in one parameter may be compensated for by an opposite error in another parameter or combinations of other parameters. The presence of an error in a parameter may be masked because of the compensation, as the joint set of parameters may produce accurate results on an image because of the compensation between errors. To increase the accuracy of the calibration, the C-arm calibration device 120 may use a parameterization of the C-arm imaging device's 103 geometry that separates the parameters into two groups of parameters in some embodiments. The two groups include: i) parameters that change as a function of position, and ii) parameters that remain fixed for all positions. The C-arm calibration device 120 determines a fixed value of the second group of parameters (fixed for all positions) and re-estimates the values of the first group of parameters. The iterative estimation of the values enables a more accurate estimation of the first group of parameters without any interference from offsetting errors in the second group of parameters. In some embodiments, the C-arm calibration device 120 determines that intrinsic parameters are part of the first group of parameters and the extrinsic parameters are part of the second group of parameters. Thus, the C-arm calibration device 120 determines values for a fixed set of extrinsic parameters, where the extrinsic parameters are kept constant for the positions and orientations of the C-arm imaging device 103. The C-arm calibration device 120 then models intermediate parameters of the C-arm imaging device 103 using the intrinsic parameters, the angulation value, and/or the orbital value for the positions of the C-arm imaging device 103 and the fixed set of extrinsic parameters. The C-arm calibration device 120 can tune the initial function form model to create a functional form model using the intermediate parameters.

In some embodiments, the C-arm calibration device 120 then models final parameters of the C-arm imaging device 103 using the initial parameters and the intermediate parameters. The C-arm calibration device 120 may compare and/or otherwise use the initial parameters and the intermediate parameters to determine final parameters for the positions of the C-arm imaging device 103. In an example implementation, the model is a functional form model that includes a function for determining each parameter at any position of the C-arm imaging device 103. The model can be configured to provide a specific output given a specific input. For example, the model can be configured to output extrinsic and intrinsic parameters. The inputs can be the orbital and angulation values for the current pose of the C-arm imaging device 103. The models can be configured to have a form corresponding to a smoothly-varying function (e.g., a polynomial). The C-arm calibration device 120 can retune the functional form model to create the final functional form model using the final parameters. The set of functions may then be used for surgical navigation. For example, when a user uses the C-arm calibration device 120 for surgical navigation, the C-arm calibration device 120 receives a C-arm image at a position, the C-arm calibration device 120 calculates the parameters as a function of the orbital and angulation values, and the C-arm calibration device 120 displays a surgical image and a rendered surgical instrument using the calculated parameters.

Thus, the C-arm calibration device 120 can perform an iterative functional form calibration to generate a final functional form model for surgical navigation. The C-arm calibration device 120 can use the parameters to calculate a projection of an instrument that the C-arm calibration device 120 can operate to render onto the displays 123. The C-arm calibration device 120 can determine the parameters for positions that were not used to determine the final parameters because the functional estimates may be smoothly varying with respect to position, and the C-arm calibration device 120 determined parameters from a number of and/or an arrangement of positions to accurately model a complete functional form model.

In some embodiments, the C-arm imaging device 103 experiences structural fatigue and/or other types of wear and tear that may cause the emitter 104 and detector 105 alignment to change and therefore affect the accuracy of the calibration determined by the C-arm calibration device 120. Additionally, the tracking device 130 can experience changes that also affect the calibration determined by the C-arm calibration device 120. Thus, in some embodiments, the C-arm calibration device 120 also updates the calibration periodically (e.g., weekly, monthly, quarterly, before a surgery, etc.). To update the calibration, the C-arm calibration device 120 receives images from two positions of the C-arm imaging device 103 and the associated position of the calibration fixture 108 and the tracking array 107 relative to the detector plane 106 from the tracking device 130 when the C-arm imaging device 103 captures images. The C-arm calibration device 120 determines the intrinsic parameters and the extrinsic parameters using the images from the two positions, the associated angulation value for each image, the associated orbital value for each image, the position of the calibration fixture 108, and/or the position of the tracking array 107 relative to the detector plane 106. The C-arm calibration device 120 then determines the error introduced since the calibration, and updates the modeled parameters (e.g., the functional form model). Because the functional form model is created during the initial calibration, the C-arm calibration device 120 may not need as many inputs to update the calibration.

Figure 6:
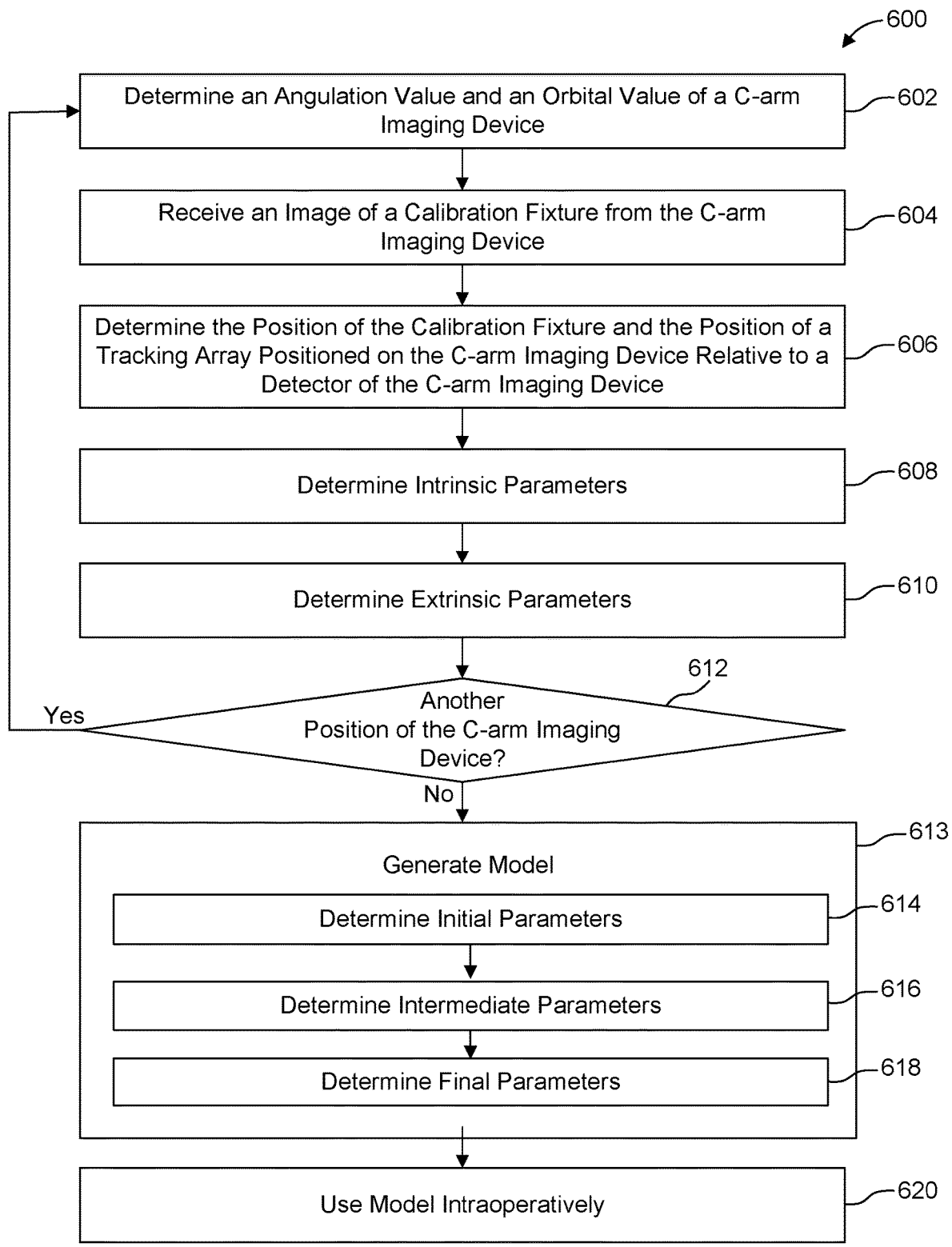
FIG. 6 illustrates a method for performing C-arm calibration according to an example embodiment.

FIG. 6 illustrates an example method 600 for performing C-arm calibration. Method 600 begins at operation 602.

In operation 602, an angulation value and an orbital value of a C-arm imaging device is determined. For example, the C-arm calibration device 120 receives the angulation value and the orbital value from the C-arm imaging device 103, and/or the C-arm calibration device 120 operates to determine the angulation value and the orbital value, using the tracking device 130 for example. In another example, the device receives one or both of the angulation value and the orbital value from a user manually specifying the data. The operation can be performed before, during, or after taking an image with the C-arm imaging device 103.

In operation 604, an image of a calibration fixture is received from the C-arm imaging device. The image can be taken while the imaging device has the angulation value and orbital value determined in operation 602. The C-arm calibration device 120 can receive the image from the C-arm imaging device 103. The C-arm calibration device 120 can cause the C-arm imaging device 103 to capture and send the image. In another example, the device receives the one or more image files from a user that manually transfers the one or more image files manually with a storage drive or another device. The image can contain a calibration fixture 108. In some examples, the images are taken while the C-arm imaging device 103 is in motion (e.g., as opposed to static shots).

In operation 606, the position of the calibration fixture and the position of a tracking array positioned on the C-arm imaging device relative to a detector of the C-arm imaging device is determined. For example, the C-arm calibration device 120 determines the position of the calibration fixture 108 and the position of the tracking array 107 using the tracking device 130 (e.g., using standard navigation techniques). In another example, the C-arm calibration device 120 receives the positions from a user that manually specifies them.

In operation 608, intrinsic parameters are determined, such as using the image of the calibration fixture and the position of the calibration fixture. The intrinsic parameters can include parameters that are intrinsic to the C-arm imaging device, such as the focal length and the offsets for a position of the C-arm imaging device 103. For example, the C-arm calibration device 120 determines the intrinsic parameters using the image of the calibration fixture 108 received in operation 604 and the position of the calibration fixture 108 determined in operation 606. Because characteristics of the calibration fixture 108 are known, the intrinsic parameters can be determined by working backwards. For instance, it can be determined what intrinsic parameters would cause a calibration feature having known characteristics to appear as shown in the image. In example implementations, the C-arm calibration device 120 compares the positions of the markers 109 in the image of the calibration fixture to the expected position of the markers 109 based on the position of the calibration fixture 108. Additionally, the C-arm calibration device 120 can use the physical dimensions of the calibration fixture 108 to perform the comparison between the position of the markers 109 in the image and the expected positions of the markers. The C-arm calibration device 120 can determine the physical dimensions of the calibration fixture 108 (e.g., using the tracking device 130), receive the physical dimensions (e.g., input by a user, stored on the C-arm calibration device 120), and/or the like. Known camera resectioning techniques can be used to determine the parameters.

In operation 610, extrinsic parameters are determined, such as using the position of the tracking array relative to the detector. For example, the C-arm calibration device 120 determines the extrinsic parameters using the position of the tracking array relative to the detector determined in operation 606. For example, the extrinsic parameters are the three translations and three rotational offsets needed to transform a location in space in a C-arm image to space represented by the tracking array 107. In an example, based on the known location of the calibration fixture 108, the extrinsic parameters can be determined by working backwards. For instance, it can be determined what extrinsic parameters would cause the calibration feature having a known position to appear as shown in the image. Known camera resectioning techniques can be used to determine the parameters.

In some embodiments, the C-arm calibration device 120 uses a calibration algorithm stored and/or executed by the C-arm calibration device 120 to determine the intrinsic parameters in operation 608 and determine the extrinsic parameters in operation 610. The C-arm calibration device 120 can operate to enter inputs into the calibration algorithm to perform operation 608 and 610. The inputs may include, for multiple positions of the C-arm imaging device 103, the images of the calibration fixture 108 received in operation 604, the dimensions of the calibration fixtures including the positions of the markers 109, the position of the calibration fixture 108 determined in operation 606, the position of the tracking array 107 determined in operation 606, and/or the like.

Thus, the C-arm calibration device 120 can determine the intrinsic parameters in operation 608 and the extrinsic parameters in operation 610 by inputting the inputs into the calibration algorithm and executing the calibration algorithm. The calibration algorithm compares the positions of the markers 109 in the images received from the C-arm imaging device 103 to expected positions of the markers 109 using the tracking device and/or the dimensions of the calibration fixture 108 to determine the intrinsic parameters in operation 608. The calibration algorithm determines the extrinsic parameters in operation 610 using the position of the tracking array 107 relative to the detector plane 106.

In decision 612, it is determined, by the C-arm calibration device 120 for example, whether another position of the c-arm imaging device 103 will be used for the calibration. If the C-arm calibration device 120 determines there is another position of the C-arm imaging device 103, the imaging device can be manually or automatically moved to that position (e.g., having new angulation and/or orbital values) and then the method 600 may proceed back to operation 602. The C-arm calibration device 120 imaging device receives another image in operation 604, determines the positions of the calibration fixture and the tracking array in operation 606, determines the intrinsic parameters for the new position in operation 608, and determines the extrinsic parameters for the new position in operation 610. The operations 602, 604, 606, 608, and 610 can be repeated for any number of positions of the C-arm imaging device. For instance, the C-arm imaging device can be manually or automatically moved (e.g., such that one or both of the angulation value and the orbital value change) to a predetermined set number of positions (or values).

If the C-arm calibration device determines that there is not another position of the C-arm imaging device for the calibration in decision 612, the method 600 proceeds to operation 613.

In operation 613, a model is generated that can be used to improve the accuracy of images generated by the C-arm imaging device. In an example, the model is configured to receive orbital and angulation values for a current pose of a C-arm imaging device as input. And the model is configured to provide as output extrinsic and intrinsic parameters of the C-arm imaging device. Those output parameters are can then be used to modify the image to correct for misalignment of the C-arm or other correctable defects. In addition or instead, the output parameters can be used to modify the rendering of the tool that is being navigated, so instead of being rendered as though the C-arm imaging device were perfectly aligned, it is rendered for our specific, misaligned C-arm imaging device. In some examples, the model is a smoothly-varying function (e.g., a polynomial function).

In addition or instead, the model is or is based on a machine learning framework (e.g., a neural network). The creation of the model can take any of a variety of forms. One or more aspects of the model can be implemented with or based on a machine-learning framework. Example machine learning frameworks include TENSORFLOW by GOOGLE INC., PYTORCH by the PYTORCH community, and or other open or closed source machine learning libraries. The machine learning framework can include one or more machine learning models that are structures for learning. The machine learning models can include one or more structures representing machine learning nodes (e.g., nodes of a neural network, decision tree, or other kind of neural network), connections between nodes, weights, matrices, other structures, or combinations thereof. The machine learning framework can define procedures for establishing, maintaining, training, and using the one or more machine learning models. Training the machine learning framework can include providing training samples as input to the machine learning framework in a useful format (e.g., after converting the training samples to the useful format), processing the samples with the machine learning framework, and receiving an output from the machine learning framework. The output can be compared with an expected result defined in association with the training samples as part and a loss determined using a loss function (e.g., mean squared error). The machine learning framework (e.g., one or more models thereof) can be modified based on the output (e.g., based on a difference between the output and the expected result). The process of training and modifying can be repeated until the error is sufficiently small.

The model can be generated in any of a variety of ways, including via operations 614, 616, and 618.

In operation 614, initial parameters of the C-arm imaging device or the model are determined. For example, the C-arm calibration device 120 determines the initial parameters using the intrinsic parameters, the extrinsic parameters, the angulation value, and the orbital value of the plurality of positions of the C-arm imaging device 103. The C-arm calibration device 120 determines the initial parameters using the calibration algorithm in example implementations. As an example, during this determination of initial parameters, it can be assumed that the physical bending and drooping of the C-arm imaging device 103 as a function of orientation is smoothly varying. Thus, the parameters can be modeled via a smoothly-varying function in orientation angle (e.g., one or both of angulation and orbital values). A functional fit can be performed for each geometric parameter as a function of orientation (e.g., using standard least-squares fitting to find the optimal shape of the function). The functional form can be chosen to match any particular C-arm imaging device (e.g., polynomial of arbitrary degree, trigonometric, or other more complex functions).

In operation 616, intermediate parameters are determined, such as by the C-arm calibration device 120. This can include using unique parameterization of the imaging device's geometry that separates into two groups of parameters: 1) parameters that change as a function of orientation values, and 2) parameters that remain essentially fixed for all orientations (e.g., no change or a change of less than a particular threshold). In this operation, the values of the second group (essentially fixed-with-orientation) are frozen, and the values of the first group of parameters are re-determined. This can enable more accurate estimation of the first group without interference from offsetting errors in the second group. These errors can arise because not all geometric parameters are entirely independent (e.g., an error in one can be compensated for by an opposite error in another, or combinations of others). The presence of an error in the parameter may be masked because of the compensation, as the joint set will produce accurate results on that image.

In operation 618, final parameters of the C-arm imaging device are determined. In this operation, in a final iteration, the final parameters are determined by re-estimating all parameters from both groups: 1) parameters that change as a function of orientation values, and 2) parameters that remain essentially fixed for all orientations (e.g., no change or a change of less than a particular threshold). This results in each parameter now being closer to its true physical value, enabling the optimization to converge to the correct (in the physical sense) set of values.

This iterative approach to building the model can yield better navigation accuracy on new images, due to converging more closely to the correct calibration parameters. This calibration technique can produce a set of estimated functions for each geometric parameter (e.g., a 2nd-order polynomial for focal length versus orientation). These functions can then be used at navigation time. For example, the user obtains a C-arm imaging device shot at some arbitrary orientation, the system can then calculate the geometric parameters as a function of this orientation, then use to calculate the projection of the navigated instrument into the image plane. "Off-grid" orientations are accurately handled, as the functional estimates are smoothly varying with respect to orientation and are sampled densely enough to accurately model the full function. The calibration results are stored on a navigation system and can be marked to be compatible with the specific C-arm imaging device that was used for calibration.

Beneficially, the system can be configured such that calibration can be rapidly updated. Structural fatigue in the imaging device often changes (generally increase) the amount of droop and sag of imaging components. Thus, a calibration has a finite lifetime (e.g., on the order of months, such as three months) under normal use conditions. Further, an imaging device can undergo transient damage that can change the internal geometry abruptly, thereby potentially necessitating updating the calibration regardless of how recent the last calibration was. Calibration also depends somewhat on the navigation devices. Thus, a change in navigation devices may render a stored calibration inaccurate. For these kinds of changes to calibration, the error can be modeled as a single translation and rotation (or put more generally, a six-degree-of-freedom transform in 3D space), independent of C-arm imaging device orientation. The system can rapidly estimate this error by imaging the calibration phantom using just two orthogonal X-rays (e.g., less than all shots at the full grid of orientations done in the full calibration procedure). These two shots can be acquired very rapidly (e.g., less than 1 minute), the error calculated, and the stored calibration updated to remove the error.

In operation 620, the model is used intraoperatively. For example, the final functional model can be stored and used intraoperatively. In an example, the final functional form model can be used as part of a surgical navigation system, such as is described in U.S. Pat. No. 11,350,995 (filed 2017 Oct. 5 as application Ser. No. 15/725,791), which is hereby incorporated herein by reference in its entirety for any and all purposes. In an example use, the model is provided orbital and angulation values for a current pose of a C-arm imaging device that took an image intraoperatively, and the model provides as output extrinsic and intrinsic parameters of the C-arm imaging device. Those parameters are then used for any of a variety of purpose. In an example, the parameters are used to modify the image to correct for misalignment of the C-arm imaging device (or other correctable defects). In addition or instead, the parameters are used to modify a rendering process of the navigation system to match the image from the misaligned C-arm imaging device.

In an example, the parameters are used for navigation. For instance, given a new image, the model is used to determine the value of these parameters for the pose of the new image, such that navigation can be conducted. In another example, the parameters are used for calibrating a new image. Such calibration can be similar to an "online" calibration technique, where the inner and outer parameters on the actual image taken during surgery.

Figure 7B:
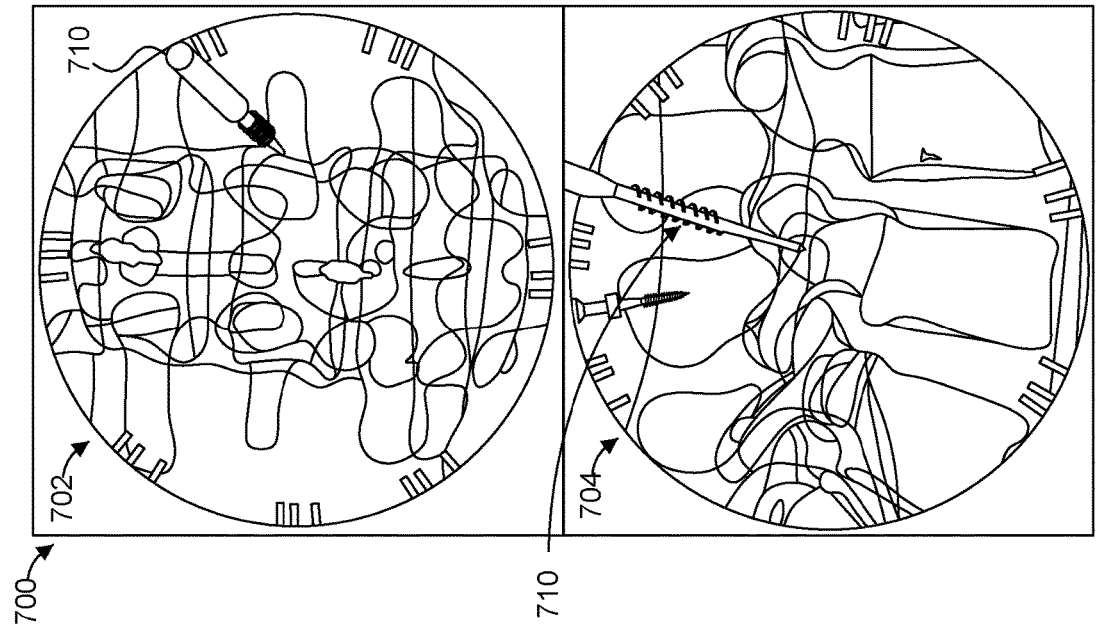
FIG. 7, which is made up of FIGS. 7A and 7B, illustrates a medical image according to an example use case.
Figure 7A:
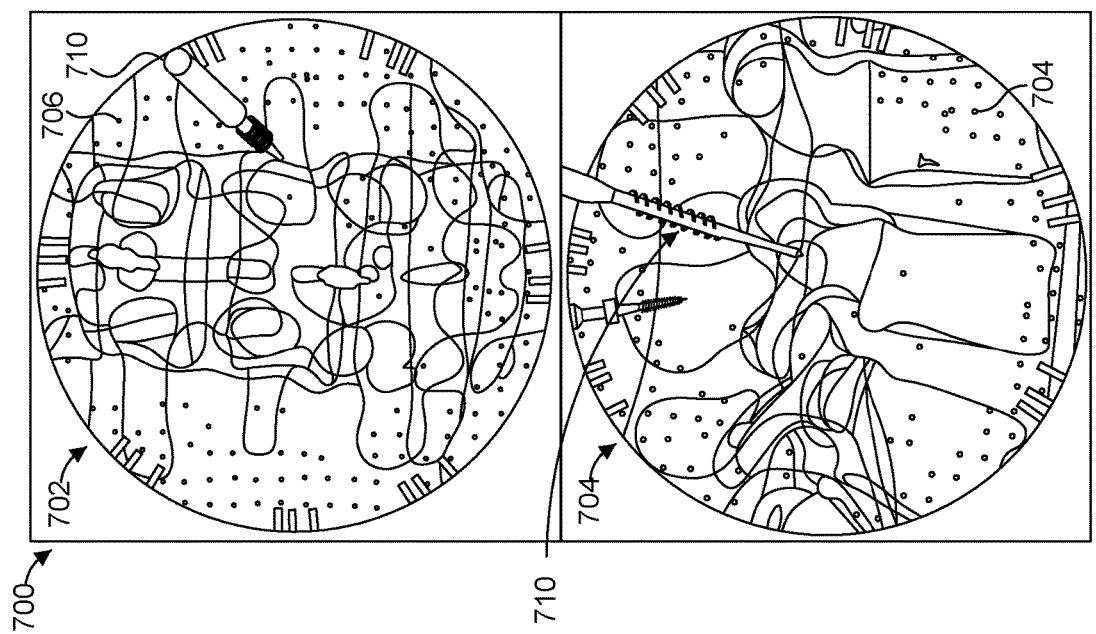

FIG. 7, which includes FIGS. 7A and 7B, illustrate example medical images 700. The medical images 700 include a first view 702 and a second view 704. A rendered instrument 710 is rendered on the first view 702 and the second view 704 based on the calibration performed by the C-arm calibration device 120. For example, the rendered instrument 710 is rendered based on the functional form model (e.g., the final functional form model) created during the calibration. In some embodiments, the C-arm calibration device 120 displays the medical image 700 on the display device 122. The medical image 700 may be used for surgical navigation during surgery. For example, the C-arm calibration device 120 displays the medical image 700 on the display device 122 and renders the rendered instrument 710 on the medical image 700 using the final functional form model.

A notable difference is that FIG. 7A illustrates the rendered medical image 700 is for the "online" variety of calibration, where a calibration object is affixed to the C-arm imaging device 103, so marker points 706 (e.g., small radiopaque BBs) in every image. FIG. 7B illustrates the same rendered medical images 700 without such marker points 706 because they are not necessary due to the offline calibration provided herein.

FIG. 8 illustrates an example computing environment 800 that can be used to implement techniques described herein. The computing environment 800 is a set of one or more virtual or physical computers configured to cause output based on data. In many examples, the computing environment 800 is a workstation, desktop computer, laptop computer, server, mobile computer, smartphone, tablet, embedded computer, other computers, or combinations thereof. In other examples, the computing environment 800 is a virtual machine, group of computers, other computing environments, or combinations thereof.

In the illustrated example, the computing environment 800 includes one or more processors 810, memory 820, and an interface 830 coupled to a network 802. The network 802 is a group of communicatively coupled computing environments and associated hardware, such as a local area network, the Internet, other networks, or combinations thereof.

The one or more processors 810 are one or more physical or virtual components configured to obtain and execute instructions. In many examples, the one or more processors 810 are central processing units, but can take other forms such as microcontrollers, microprocessors, graphics processing units, tensor processing units, other processors, or combinations thereof.

The memory 820 is one or more physical or virtual components configured to store information, such as data or instructions. In some examples, the memory 820 includes the computing environment's main memory (e.g., random access memory) or long-term storage memory (e.g., a solid state drive). The memory can be transitory or non-transitory computer-readable or processor-readable storage media.

The interface 830 is a set of one or more components by which the computing environment 800 can provide output or receive input. For example, the interface 830 can include one or more user input components, such as one or more sensors, buttons, pointers, keyboards, mice, gesture controls, touch controls (e.g., touch-sensitive strips or touch screens), eye trackers, voice recognition controls (e.g., microphones coupled to appropriate natural language processing components), other user input components, or combinations thereof. The interface 830 can include one or more user output components, such as one or more lights, displays, speakers, haptic feedback components, other user output components, or combinations thereof. The interface 830 can further include one or more components configured to provide output to or receive input from other devices, such as one or more ports (e.g., USB ports, THUNDERBOLT ports, serial ports, parallel ports, Ethernet ports) or wireless communication components (e.g., components configured to communicate according to one or more radiofrequency protocols, such as WI-FI, BLUETOOTH, ZIGBEE, or other protocols).

The computing environment 800 can include one or more additional components or connections among components (e.g., busses).

The computing environment 800 can be configured to implement one or more aspects described herein. Algorithms, steps, or procedures for so configuring the computing environment and performing functions described herein can be understood from the description herein in view of knowledge in the art of how to implement computer functions.

The computing environment 800 can be configured to implement one or more aspects described herein. Algorithms, steps, or procedures for so configuring the computing environment and performing functions described herein can be understood from the description herein in view of knowledge in the art of how to implement computer functions.

Example techniques for implementing such computer functions include frameworks and technologies offering a full stack of plug-and-play capabilities for implementing desktop and browser-based applications (e.g., the applications implementing aspects described herein). The frameworks can provide a desktop web application featuring or using an HTTP server such as NODEJS or KATANA and an embeddable web browser control such as the CHROMIUM EMBEDDED FRAMEWORK or the JAVA/.NET CORE web view. The client-side frameworks can extend that concept by adding plug-and-play capabilities to desktop and the web shells for providing apps capable of running both on the desktop and as a web application. One or more components can be implemented using a set of OWIN (Open Web Interface for .NET) components built by MICROSOFT targeting the traditional .NET runtime. KATANA, and by definition OWIN, allow for chaining together middleware (OWIN-compliant modules) into a pipeline thus offering a modular approach to building web server middleware. For instance, the client-side frameworks can use a Katana pipeline featuring modules such as SIGNALR, security, an HTTP server itself. The plug-and-play capabilities can provide a framework allowing runtime assembly of apps from available plugins. An app built atop of a plug-and-play framework can have dozens of plugins, with some offering infrastructure-level functionality and other offering domain-specific functionality. The CHROMIUM EMBEDDED FRAMEWORK is an open source framework for embedding the CHROMIUM browser engine with bindings for different languages, such as C# or JAVA. OWIN is a standard for an interface between .NET web applications and web servers aiming at decoupling the relationship between ASP.NET applications and IIS by defining a standard interface.

Further example techniques for implementing such computer functions or algorithms include frameworks and technologies provided by or in conjunction with programming languages and associated libraries. For example, languages such as C, C++, C#, PYTHON, JAVA, JAVASCRIPT, RUST, assembly, HASKELL, other languages, or combinations thereof can be used. Such languages can include or be associated with one or more standard libraries or community provided libraries. Such libraries in the hands of someone skilled in the art can facilitate the creation of software based on descriptions herein, including the receiving, processing, providing, and presenting of data. Example libraries for PYTHON and C++ include OPENCV (e.g., which can be used to implement computer vision and image processing techniques), TENSORFLOW (e.g., which can be used to implement machine learning and artificial intelligence techniques), and GTK (e.g., which can be used to implement user interface elements). Further examples include NUMPY for PYTHON (e.g., which can be used to implement data processing techniques). In addition, other software can provide application programming interfaces that can be interacted with to implement one or more aspects described herein. For example, an operating system for the computing environment (e.g., WINDOWS by MICROSOFT CORP., MACOS by APPLE INC., or a LINUX-based operating system such as UBUNTU by CANONICAL LTD.) or another component herein (e.g., an operating system of a robot, such as IIQKA.OS or SUNRISE.OS by KUKA ROBOTICS CORPORATION where the robot is a model of KUKA ROBOTICS CORPORATION) can provide application programming interfaces or libraries to usable to implement aspects described herein. As a further example, a provider of a navigation system, laser console, wireless card, display, motor, sensors, or another component may not only provide hardware components (e.g., sensor, a camera, wireless card, motor, or laser generator), but also software components (e.g., libraries, drivers, or applications) usable to implement features with respect to the components.

While various descriptions of the aspects of the present disclosure may refer to a surgeon, or surgeons, it is to be understood that the functionality of such aspects may extend to other users, as contextually appropriate, such that the term "surgeon(s)" supports the term "user(s)". In some examples, a surgeon can be a surgical robot.

Examples herein include methods that include operations. Although the operations in each figure are illustrated in a sequential order, the operations may in some instances be performed in parallel, and/or in a different order than those described therein. Also, the various operations may be combined into fewer operations, divided into additional operations, and/or removed based upon the desired implementation.

In addition, diagrams can show the functionality of possible implementations. Operations can represent a module, a segment, or a portion of program code, which includes one or more instructions executable by one or more processors (e.g., CPUs) for implementing specific logical functions or steps in the process. The program code may be stored on any type of computer readable medium, for example, such as a storage device including a disk or hard drive. The computer readable medium may include non-transitory computer-readable media that stores data for short periods of time, such as register memory, processor cache, or Random Access Memory (RAM), and/or persistent long term storage, such as read only memory (ROM), optical or magnetic disks, or compact-disc read only memory (CD-ROM), for example. The computer readable media may be able or include, any other volatile or non-volatile storage systems. The computer readable medium may be considered a computer readable storage medium, a tangible storage device, or other article of manufacture, for example. The computer-readable medium can be communicatively coupled to the one or more processors. The one or more processors can be coupled to one or more interfaces for providing data to or receiving data from one or more users or other devices. Example interfaces include universal serial busses, displays, speakers, buttons, networking components (e.g., wired or wireless networking components), other interfaces, or combinations thereof).

Operations can represent circuitry that is wired to perform the specific logical functions in the process. Illustrative methods can be carried out in whole in or in part by a component or components in the cloud and in a system. However, it should be understood that the example methods may instead be carried out by other entities or combinations of entities (e.g., by other computing devices and/or combination of computer devices), without departing from the scope of the invention. For example, certain operations can be fully performed by a computing device (or components of a computing device such as one or more processors) or can be distributed across multiple components of the computing device, across multiple computing devices, and/or across a server.

What is claimed is:

1. A method for calibrating a C-arm imaging device, comprising:
   for each of a plurality of positions of the C-arm imaging device:
      determining an angulation value and an orbital value of the C-arm imaging device,
      preoperatively receiving an image of a calibration fixture from the C-arm imaging device, the imaging having been taken while the C-arm imaging device had the angulation value and the orbital value,
      determining the position of the calibration fixture and the position of a tracking array positioned on the C-arm imaging device relative to a detector plane of a detector of the C-arm imaging device using a tracking system,
      determining intrinsic parameters using the image of the calibration fixture and the position of the calibration fixture, and
      determining extrinsic parameters using the position of the tracking array relative to the detector plane; and
   generating a model configured to receive orbital and angulation values for a current pose of the C-arm imaging device as input and configured to provide as output extrinsic and intrinsic parameters of the C-arm imaging device, wherein generating the model includes:
      determining initial parameters using the intrinsic parameters, the extrinsic parameters, the angulation value, and the orbital value of the plurality of positions of the C-arm imaging device,
      determining intermediate parameters using the intrinsic parameters, the angulation value, and the orbital value of the plurality of positions of the C-arm imaging device, and a fixed set of extrinsic parameters, and
      determining final parameters using the initial parameters and the intermediate parameters,
   wherein at least two of the images received were taken while the C-arm imaging device is in motion.

2. The method of claim 1, wherein the intrinsic parameters comprise:
   a focal length;
   a first offset in a first axis between an emitter of the C-arm imaging device and the detector; and
   a second offset in a second axis between the emitter and the detector.

3. The method of claim 1, wherein the extrinsic parameters comprise:
   a first translation in a first axis between the tracking array and the detector plane;
   a second translation in a second axis between the tracking array and the detector plane;
   a third translation in a third axis between the tracking array and the detector plane;
   a first rotational offset in the first axis between the tracking array and the detector plane;
   a second rotational offset in the second axis between the tracking array and the detector plane; and a third rotational offset in the third axis between the tracking array and the detector plane.

4. The method of claim 1, wherein:
determining the intermediate parameters comprises tuning the initial parameters to form the intermediate parameters.

5. The method of claim 1, wherein the model is a functional form model; and
wherein generating the model includes performing a functional fit for the intrinsic parameters and the extrinsic parameters.

6. The method of claim 1, wherein, for each of the plurality of positions of the C-arm imaging device, the image, the position of the calibration fixture, and the position of the tracking array positioned on the C-arm imaging device relative to the detector plane are time synchronized.

7. The method of claim 1, further comprising using the model for at least three months without updating the model.

8. The method of claim 7, further comprising:
updating the model, wherein the updating includes:
for two new positions of the C-arm imaging device:
determining the angulation value and the orbital value of the C-arm imaging device,
receiving a new image of the calibration fixture from the C-arm imaging device,
determining the position of the calibration fixture and the position of the tracking array positioned on the C-arm imaging device relative to the detector plane using the tracking system,
determining new intrinsic parameters using the new image of the calibration fixture and the position of the calibration fixture, and
determining new extrinsic parameters using the position of the tracking array relative to the detector plane; and
updating the model based on the new intrinsic parameters, the new extrinsic parameters, the angulation value, and the orbital value for the two new positions of the C-arm imaging device.

9. A system for calibrating a C-arm imaging device, comprising:
a calibration fixture configured to be imaged by the C-arm imaging device;
a tracking array configured to be positioned on the C-arm imaging device;
a tracking device configured to track the calibration fixture and the tracking array; and
a C-arm calibration device comprising one or more processors and a memory, wherein the memory comprises instructions that, when executed by the one or more processors, causes the one or more processors to:
for each of a plurality of positions of the C-arm imaging device:
determine an angulation value and an orbital value of the C-arm imaging device,
preoperatively receive an image of the calibration fixture from the C-arm imaging device,
determine the position of the calibration fixture and the position of the tracking array positioned on the C-arm imaging device relative to a detector plane of a detector of the C-arm imaging device using the tracking device,
determine intrinsic parameters using the image of the calibration fixture and the position of the calibration fixture,
determine extrinsic parameters using the position of the tracking array relative to the detector plane;

generate a model using the intrinsic parameters, the extrinsic parameters, the angulation value, and the orbital value of the plurality of positions of the C-arm imaging device, and
update the model after no less than three months.

10. The system of claim 9, wherein the memory further comprises instructions that, when executed by the one or more processors, causes the one or more processors to perform an iterative functional form calibration to refine the model.

11. The system of claim 10, wherein to perform the iterative functional form calibration to refine the model comprises to:
fix a set of extrinsic parameters;
determine intermediate parameters using the intrinsic parameters, the angulation value, and the orbital value of the plurality of positions of the C-arm imaging device and the fixed set of extrinsic parameters; and
determine final parameters of the C-arm imaging device using the parameters and the intermediate parameters.

12. The system of claim 9, wherein the model is configured to receive orbital and angulation values for a current pose of the C-arm imaging device as input and configured to provide as output extrinsic and intrinsic parameters of the C-arm imaging device.

13. The system of claim 9, where generating the model includes to perform a functional fit for the intrinsic parameters and the extrinsic parameters.

14. The system of claim 9, wherein the intrinsic parameters comprise:
a focal length;
a first offset in first axis between an emitter of the C-arm imaging device and the detector; and
a second offset in a second axis between the emitter and the detector.

15. The system of claim 9, wherein the extrinsic parameters comprise:
a first translation in a first axis between the tracking array and the detector plane;
a second translation in a second axis between the tracking array and the detector plane;
a third translation in a third axis between the tracking array and the detector plane;
a first rotational offset in the first axis between the tracking array and the detector plane;
a second rotational offset in the second axis between the tracking array and the detector plane; and
a third rotational offset in the third axis between the tracking array and the detector plane.

16. The system of claim 9, where to update the model comprises to:
for two new positions of the C-arm imaging device:
determine the angulation value and the orbital value of the C-arm imaging device,
cause the C-arm imaging device to capture a new image of the calibration fixture,
determine the position of the calibration fixture and the position of the tracking array positioned on the C-arm imaging device relative to the detector plane,
determine new intrinsic parameters using the new image of the calibration fixture and the position of the calibration fixture, and
determine new extrinsic parameters using the position of the tracking array relative to the detector plane; and
update the model based on the new intrinsic parameters, the new extrinsic parameters, the angulation value, and the orbital value for the two new positions of the C-arm imaging device.

17. The system of claim 9, further comprising a display device configured to display images, wherein the memory further comprises instructions that, when executed by the one or more processors, causes the one or more processors to:
   render a surgical instrument in a location in a medical image; and
   cause the display device to display the medical image including the rendered surgical instrument.

18. The system of claim 9, wherein to generate the model is performed offline.

\* \* \* \* \*